United States Patent [19]
Gerigk et al.

[11] 4,064,673
[45] Dec. 27, 1977

[54] METHOD OF MAKING SHEATHED STICK

[75] Inventors: Gunter Gerigk, Oberursel; Klaus-Jürgen Bittner; Armin Köstner, both of Wiesbaden, all of Germany

[73] Assignee: Hoechst Aktiengesellschaft, Germany

[21] Appl. No.: 730,753

[22] Filed: Oct. 7, 1976

Related U.S. Application Data

[62] Division of Ser. No. 586,224, June 12, 1975, Pat. No. 4,013,099.

[30] Foreign Application Priority Data

Mar. 12, 1975 Germany .............................. 2510637

[51] Int. Cl.² ............................................. B65B 5/00
[52] U.S. Cl. ........................................ 53/3; 29/450; 206/303; 206/802; 17/41
[58] Field of Search ............... 29/450; 138/118.1, 126; 53/13, 3, 21; 206/303, 802; 17/41; 425/105

[56] References Cited

U.S. PATENT DOCUMENTS

| | | | |
|---|---|---|---|
| 2,150,471 | 3/1939 | Van Vulpen | 138/126 X |
| 2,871,508 | 2/1959 | Hill | 17/41 |
| 2,933,866 | 4/1960 | Cranston | 53/3 |
| 3,148,992 | 9/1964 | Hewitt | 206/802 X |
| 3,528,825 | 9/1970 | Doughty | 206/802 UX |
| 3,639,130 | 2/1972 | Eichin | 138/118.1 |
| 3,864,494 | 2/1975 | Kupcikecicius et al. | 426/105 X |

*Primary Examiner*—Charlie T. Moon
*Attorney, Agent, or Firm*—James E. Bryan

[57] ABSTRACT

This invention relates to an improvement in a sheathed, hollow, cylindrical stick composed of a flexible tube folded by longitudinal shirring, the improvement comprising a cylindrical, flexible jacket means enveloping said stick and projecting over the ends thereof, parts of the projecting portions touching the front walls of said stick with their inner sides, annular disc means on said projecting portions, and said projecting portions being inverted outwardly around said disc means in a manner such that the inner walls, the end surfaces and the outer walls of said disc means are tightly covered, and said inverted portions being parallel to said jacket means and close to the exterior thereof. The invention also includes an embodiment wherein annular disc means are inserted inside the jacket means and adjacent to the front walls of the stick, the projecting portions of the jacket means are inverted around the annular disc means and clamping means are inserted in the opening of the annular disc means. The invention also includes processes for the production of the sheathed hollow cylindrical stick.

5 Claims, 12 Drawing Figures

METHOD OF MAKING SHEATHED STICK

This is a division of application Ser. No. 586,224, filed June 12, 1975, now U.S. Pat. No. 4,013,099.

The invention relates to a sheathed, hollow, cylindrical stick composed of a flexible tubular casing which is folded by longitudinal shirring. The invention thus comprises a unit composed of a stick, a jacket which envelops the outside thereof and leaves the openings thereof free, as well as means for fixing the jacket in its spatial position around the stick.

The invention further relates to a process for the production of the above-mentioned shaped bodies.

Large quantities and many variations of meat in the form of sausage meat, filled into synthetic tubular casings, are offered on the market. The artificial sausage casings are composed either of synthetic material or, preferably, of cellulose hydrate, and particularly preferred are tubes composed of cellulose hydrate having a fibrous component.

The production of sausages is based on tubes of the above-mentioned kind which have a length of, for example, about 20 m. These tubes are longitudinally shirred and at the same time folded in known manner by common apparatuses in order to form hollow cylindrical sticks which are open at both ends and are simultaneously or later pressed in the direction of their longitudinal axis. These hollow sticks formed by shirring tubes have a length of about 40 cm, if the original length of the tubes mentioned above is taken as a basis.

In order to be filled with sausage meat, a stick is first closed on one end and then slid onto the stuffing horn of a sausage filling machine, with the other orifice thereof head-on. The sausage meat is then pressed into the stick, a process during which the stick is continuously unfolded and thus the tube is filled with sausage meat.

Tubular sticks do have a certain dimensional stability which is due to their production, but they are sensitive to bending and easily break into two or more parts which are connected with each other by unfolded tubular parts.

The great mechanical stress to which the tube forming the stick is subjected during the filling process renders it necessary to wet the sticks before they are filled. As a consequence, absorption of water by the tube, which causes the material forming the stick to swell, the danger of deforming the stick arises when the wet stick is further used.

The danger is particularly great for the sticks to lose their original form, because of the two above-mentioned effects during their use, if the tubular casings forming the sticks have a relatively great wall thickness, e.g. a thickness of 0.07 mm, and have a relatively large inner diameter, e.g. a diameter of 40 mm.

Therefore it already has been proposed to protect sticks by enveloping them with a grid tube. In this method, the stick is inserted in a grid tube of synthetic material having a sufficient length. One of the two parts of the grid or lattice tube which project over the ends of the stick is then inverted into the hollow space of and pulled through the entire stick, and is connected with the other part of the lattice tube outside the second orifice of the stick.

This protection is, as are other known methods of protection, relatively expensive. It also has the disadvantage that the orifice of the stick, through which the sausage meat or the stuffing horn of the sausage filling machine is inserted during the filling of the stick, is closed by a lock so that the entire casing must be removed from the stick before it is filled. Furthermore, the folds of the shirred casing get caught in the lattice and thus create the danger of damaging the tubular casing which forms the stick, and may cause difficulties in unfolding the stick during filling.

The fact that the sticks enveloped in the known manner with lattice casings are immersed in water before being used causes a considerable internal pressure of the tubular casing which forms the stick, a pressure which in turn may lead to the stick bending in the lattice. As a consequence thereof, undesired obstructions occur when the stick is slid onto the stuffing horn of the sausage filling machine. Furthermore, there is the danger of lattice fibers entering the sausage meat.

It is the object of the invention to provide a shirred tubular food casing in the form of a hollow stick the outside of which is closely enveloped by an equally tubular jacket and which renders it possible, because of the particular fixing device of the tube jacket, to slide the sheathed stick onto the stuffing horn of a sausage filling machine, and guarantees the dimensional stability of the stick when used according to its purpose. The casing prevents contamination and drying of the stick and renders possible a complete wetting of the tube forming the stick.

This object is achieved, according to a first variation, by a sheathed, hollow, cylindrical stick composed of a flexible tube which is folded by longitudinal shirring. The stick is surrounded by a flexible tubular casing and has clamping means for fixing this casing, the outside of the stick being enveloped by a cylindrical and flexible jacket which projects over the ends of the stick, the inside of parts of the projecting portions which are close to the jacket touching the front walls of the stick. Annular discs are slid onto the projecting parts and touch those surfaces of the parts of the projecting portions close to the jacket which face away from the front walls of the stick and the projecting parts are inverted outwardly and downwardly around the annular discs in such a manner that they closely cover the inner walls, the surfaces and the outer walls of the annular discs. The inverted parts of the projecting portions which are directed downwardly are arranged parallel to the jacket and close to the outside thereof.

The object is also achieved by another variation of the invention which is composed of a sheathed cylindrical stick of a flexible tube folded by longitudinal shirring, of a flexible, tubular casing surrounding the stick and of clamping means for fixing it. Annular discs are arranged on the front walls of the stick and the outside of the stick is enveloped by a cylindrical jacket the projecting parts of which are inverted around the annular disc and are clamped between the inner wall of the annular disc and a clamping device is arranged in the opening of the annular disc and has the form of a short hose liner having an orifice brim.

The jacket covers only the outside of the stick, and the projecting portions thereof protrude over the ends of the stick. The jacket leaves free the openings of the hollow space of the stick and is a tube which may have a few or larger number of very fine perforations or punchings.

The part of the projecting portion close to the jacket means an integral part of the projecting portion directly adjacent to the jacket, the length of which part is once or twice the width of the front wall of the stick.

The jacket is connected with the stick in such a manner that it cannot be unintentionally detached therefrom if the sheathed stick is used according to its intended purpose. The term "connected" means that the stick and the jacket can be detached without damaging either of them.

If the sheathed stick is used according to its intended purpose, however, it is not necessary to detach the jacket from the stick.

"Use of the sheathed stick according to its intended purpose" means the storage, transportation, wetting, as well as filling the wetted and sheathed stick with sausage meat or other pasty goods in conventional filling machines. In this case the filling process is finished when, due to the pressure of the sausage meat which leaves the stuffing horn and enters the hollow space of the stick closed on one end, essentially the entire length of the folded tube forming the stick is unfolded and filled with sausage meat. After filling the tube forming the stick with sausage meat, the jacket is no longer used.

The jacket is composed of a flexible tube which has, over its entire length, the same cross-section. Preferably the jacket is a plastic tube, advantageously a plastic tube composed of an oriented polyethylene terephthalate film. Particularly preferred is a tube of cellulose hydrate or, even more preferred, of a cellulose hydrate having a fibrous component, preferably a component of paper fibers. It is also preferred to use a transparent jacket.

The preferred jacket based on a cellulose hydrate tube having a component of paper fibers is permeable to water but has wet strength.

The expression "wet strength" means that it has a wet strength of at least 1 kg/mm$^2$ in the case of a water content of 130 to 160 percent by weight, based on the total weight of the tube. The term "hollow cylindrical jacket composed of a flexible tube" includes not only those composed of the materials stated but also thin-walled, flexible, dimensionally stable and cylindrical bodies composed of aluminum which can be inverted.

The tubular casing which forms the jacket and the projecting parts has an internal diameter which is essentially the same as, or only insignificantly greater than, the external diameter of the stick to be sheathed. The length of the jacket plus the projecting parts is such that it corresponds to the length of the stick to be sheathed plus the length corresponding to the double diameter of the stick. The length of each of the projecting parts corresponds to the diameter of the stick. Each of the projecting parts preferably has a length corresponding to about one tenth of the length of the stick. Particularly preferred is a length of from 3 to 5 cm.

The wall thickness of the jacket plus the projecting parts preferably corresponds to the wall thickness of the tube forming the stick and ranges from 60 to 120$\mu$.

In a preferred embodiment of the invention, the jacket and the stick are composed of a cellulose hydrate tube, preferably of a cellulose hydrate tube having a fibrous component, e.g. a fiber-reinforced cellulose hydrate tube.

The invention also includes clamping elements which are arranged on both sides of the jacket in order to fix it in its spatial position around the stick.

According to the first variation of the invention, the clamping element is an annular disc. According to the second variation, it is composed of two functional elements.

The annular disc has a circular opening in its center and is limited by two parallel and planar surfaces as well as an inner and an outer wall. The external diameter of the annular disc corresponds essentially to the external diameter of the stick and its internal diameter to the internal diameter of the stick, which is defined by the diameter of the hollow space of the stick. The thickness of the annular disc is not important. According to the first variation of the invention, the annular disc preferably has a thickness ranging from 0.1 to 0.3 mm. According to the second variation, the annular disc advantageously has a thickness of 0.5 cm. The circular ring may be composed of any material which imparts sufficient dimensional stability thereto. It preferably is a plastic, in particular low-pressure polyethylene.

The stick, the jacket and the clamping elements for the jacket together form a functional unit and their combined effect is a prerequisite for the success of the invention. During storage, transporation, wetting and the filling of the stick with sausage meat, the clamping elements are not detached from the jacket, e.g. the jacket is not detached from the stick. The hollow space of the sheathed stick is open at both ends. If the stick is used according to its intended purpose, the stuffing horn of the sausage filling machine can be inserted in this hollow space, in known manner. As explained above, the stick then can be continuously unfolded, in known manner, by pressing the sausage meat into it until the entire tube which forms the stick is filled with sausage meat and no tubular casing is left inside the jacket. Thus, it is not necessary to detach the jacket from the stick in order to be able to fill the stick with sausage meat in the conventional manner.

The jacket enveloping the entire outside of the stick has the following effects:

1. The dimensional stability and mechanically desirable condition of the stick are guaranteed if it is used according to its intended purpose, there is usually no danger of breaking the dry stick, and the stick is dimensionally stable in its wet state.

2. Contamination and a too rapid drying of the stick after its production are prevented.

3. The folding edges of the stick are protected against damage caused by mechanical action and jackets composed of material permeable to water in addition render possible a quick and uniform wetting without the aid of mechanical aids, such as dip sticks, which have to be detached from the stick when it is further used, and the direct use of the sheathed and wetted stick in the filling process.

The embodiment according to the first variation of the invention is produced, for example, in the following manner:

A stick composed of a cellulose hydrate tube and folded in the longitudinal direction is slid into a section of a cellulose hydrate tube having the corresponding measurements, the internal diameter of this tube being only marginally greater than the external diameter of the stick. The length of the tube section is calculated in such a manner that it forms a jacket around the stick with projecting portion on both sides, portions of which each project over one end of the stick by a length corresponding to the external diameter of the stick.

The annular discs which have a clamping effect are slid onto the projecting parts of the tube, which envelops the stick, in the direction of the front wall of the stick until a portion of the projecting part directly adjacent to the jacket is pressed against the surfaces of the annular discs because of their pressure. Under conditions which prevent a change of the position of the annular disc with regard to the stick, the projecting portion of the jacket is then inverted to the outside and downwardly by means of a traction acting upon the end of the projecting portion, in such a manner that afterwards the inverted part of the projecting portion of the jacket is arranged parallel and closely adjacent to the outside thereof. The projecting portion of the jacket is thus closely adjacent to the inner wall of the annular disc, to its surface and its outer wall so that it is enveloped by the projecting portion on all sides.

Furthermore, at least the projecting portion of the jacket is wetted with water before or after being inverted, particularly if the jacket plus the projecting portion thereof is composed of cellulose hydrate. Thus, in this case the inverted part of th projecting portion of the jacket easily adheres closely and firmly to the jacket, thereby forming a particularly advantageous and dimensionally stable casing for the stick.

The embodiment of the invention according to the second variation is produced by a process in which a stick is slid into a jacket composed of a tube section which is longer than the stick, in such a manner that the jacket projects over both ends of the stick. Then, an annular disc is applied to each of the front walls of the stick, both projecting portions of the jacket are inverted inwardly over the surface of the annular disc into the hollow space of the stick, and then a clamping element in the form of a hose liner is pressed into the opening of each of the annular discs in such a manner that the inverted parts of the projecting portions of the jacket are clamped between the inner wall of the annular disc and the outer wall of the clamping element.

According to the second variation of the invention, the fastening element is composed of two shaped parts, i.e. an annular disc and a clamping element. The clamping element has the form of a straight, short hose liner which is open on both ends and has a passage at its center in the form of a hollow space the cross-section of which is a circle.

The hose liner is surrounded at one of its orifices by a flange-like brim, which brim is at a right angle with the longitudinal axis of the hose liner and protrudes to the outside. The hose liner has a small height, for example 1 cm. The external diameter of the hose liner is slightly larger near the end opposite the brim of the orifice than in the other areas.

The width of the orifice brim of the hose liner corresponds to the width of the annular disc, defined by the distance between the external and internal diameters.

The two shaped parts forming the clamping element are dimensionally stable and are composed of water-insoluble material. They preferably are a plastic, for example low-pressure polyethylene, polyamide, polyvinyl chloride, or the like. However, they also may be made of metal.

The invention will now be further described with reference to the accompanying drawings in which FIG. 4 shows the embodiment according to the preferred first variation of the invention.

FIGS. 6 to 10 show an embodiment according to the second variation of the invention.

Figure 1:
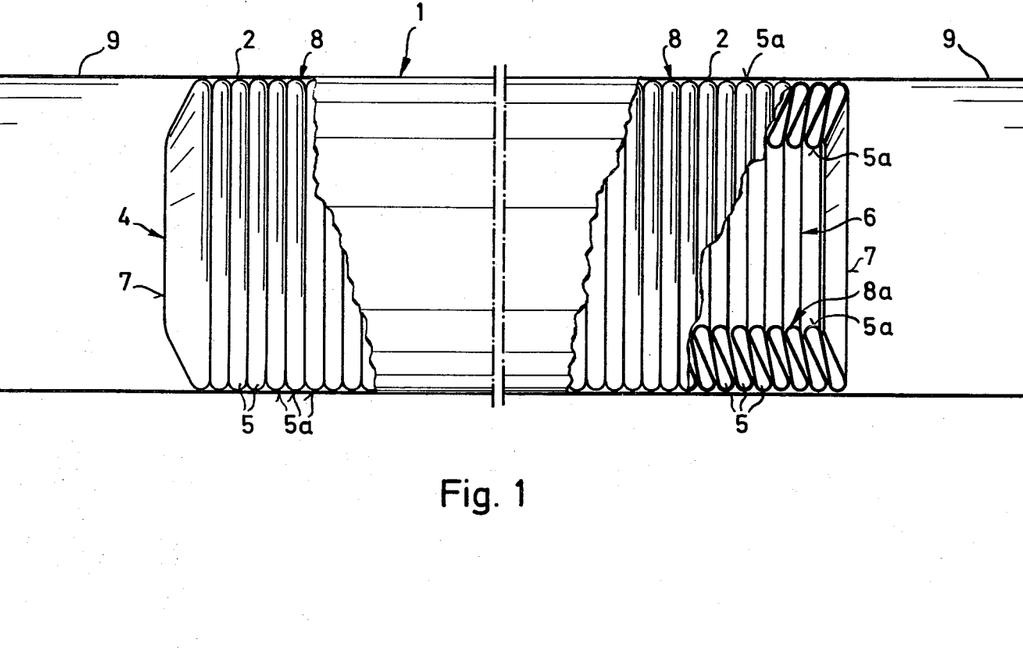
FIG. 1 shows a stick arranged inside a tubular jacket having projecting portions.

In FIG. 1, 1 is the sheathed stick, 2 is the jacket composed of a portion of the tube, 4 is the hollow, cylindrical stick open at both ends and being a tube folded in the longitudinal direction, 5 is one folding of the stick, 5a is the folding edge of the stick, 6 is the hollow space of the stick, 7 is the front wall of the stick, 8 is the outer wall of the stick, 8a is the inner wall of the stick and 9 is the projecting portion of the jacket.

Figure 2:
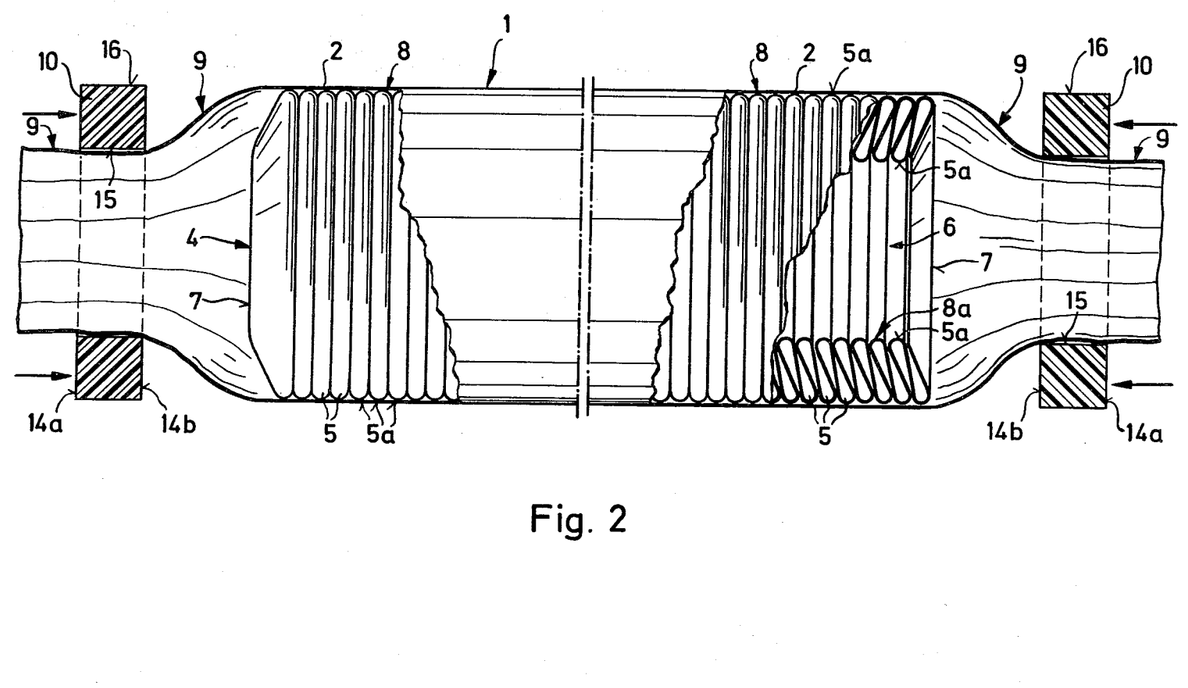
FIG. 2 shows the same sheathed stick with annular discs slid onto the projecting portions of the jacket.

In FIG. 2 the numerals 1, 2, 4, 5, 5a, 6, 7, 8, 8a, and 9 designate the same parts as in FIG. 1. 10 is an annular disc, 14a and 14b are surfaces of the annular disc, and 15 and 16 are the inner and outer walls of the annular disc, respectively.

Figure 3:
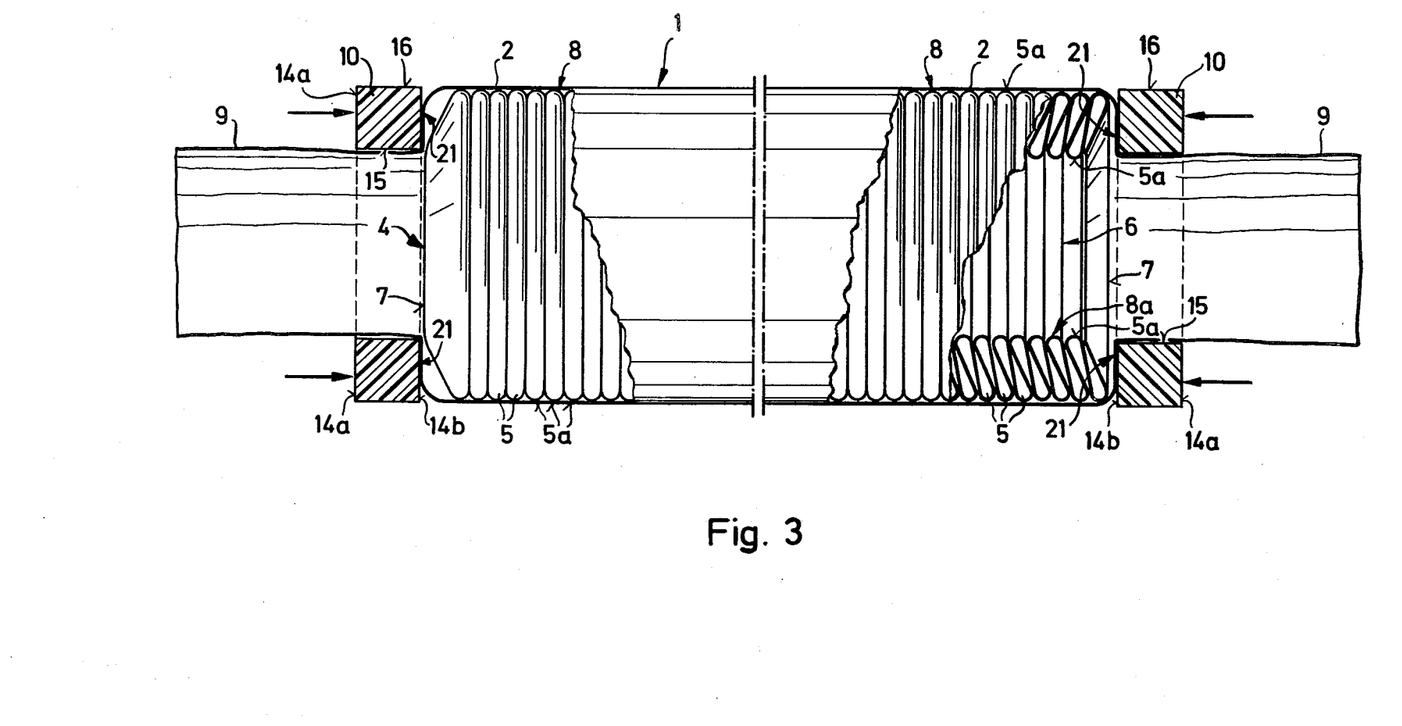
FIGS. 3 and 3a show the sheathed stick with areas of the projecting portions of the jacket near the jacket being clamped between the front wall of the stick and the surface of the annular discs, a position obtained by sliding the annular discs onto the projecting portions in the direction of the orifice of the stick.
Figure 3A:
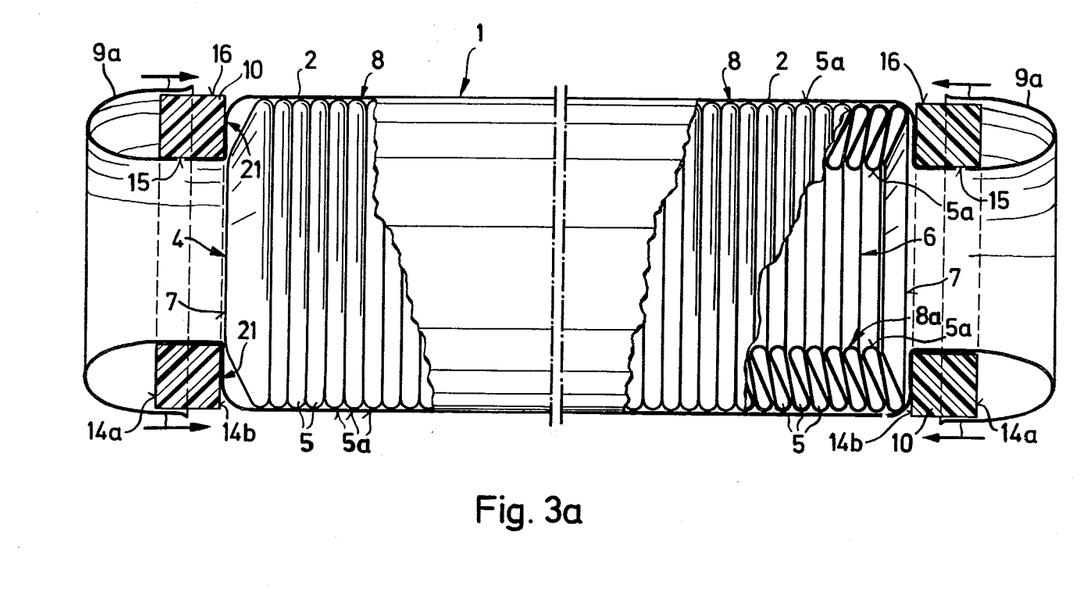

In FIGS. 3 and 3a, 21 is the part of the projecting portion 9 of the jacket which is arranged between the front wall 7 of the stick and the surface 14b of the annular disc 10 and which is directly adjacent the jacket.

In FIG. 3a the end area 9a of the projecting portion 9 of the jacket is shown inverted in part to the outside and downwardly.

Figure 4:
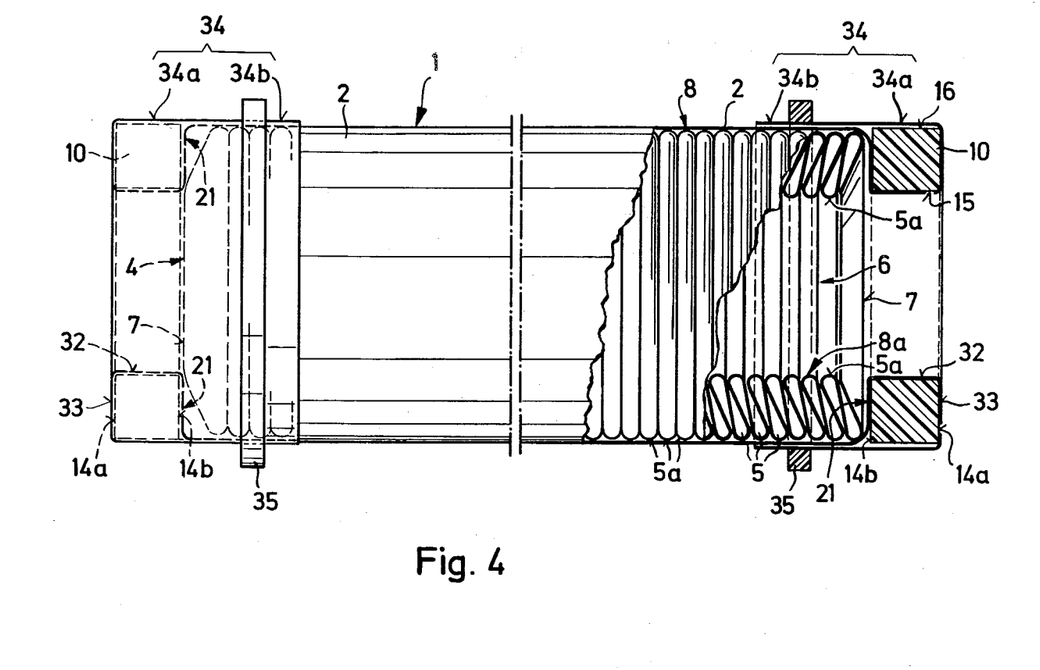
FIG. 4 shows the sheathed stick with the projecting portions of the jacket inverted to the outside and downwardly, the inverted part being adjacent to the outside of the jacket and parallel thereto.

In FIG. 4, 32 is that part of the projecting portion which touches the inner wall 15 of the annular disc 10, 33 is the part of the projecting portion which is adjacent the surface 14a of the annular disc, 34 shows the part designated by number 9 in its inverted state, the area 34a of the inverted part being closely adjacent to the outer wall 16 of the annular disc 10 and the part 34b being closely adjacent to the outside of the jacket and parallel to it. 35 is a clamping ring the spring tension of which works radially and thus presses the projecting portion against the jacket wall. The other numerals in FIG. 4 have the same meaning as in FIG. 1.

Figure 5:
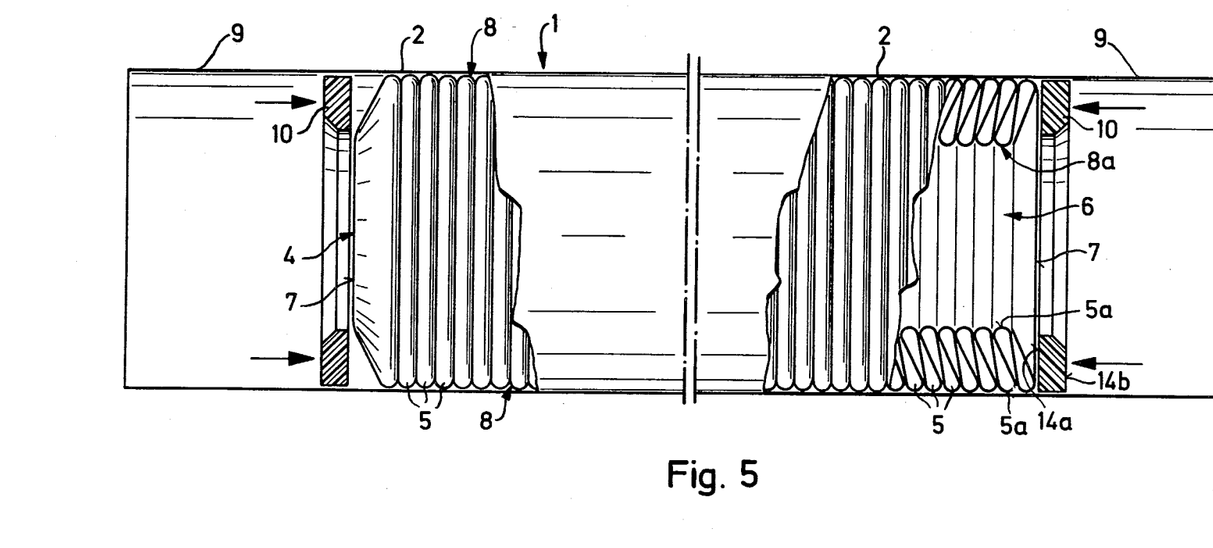
FIG. 5 shows a sheathed stick according to FIG. 1 which differs from FIG. 2 in that the annular discs within the tubular jacket are arranged directly adjacent to the front wall of the stick.

In FIG. 5 the numerals have the same meaning as in FIGS. 1 to 4.

Figure 6:
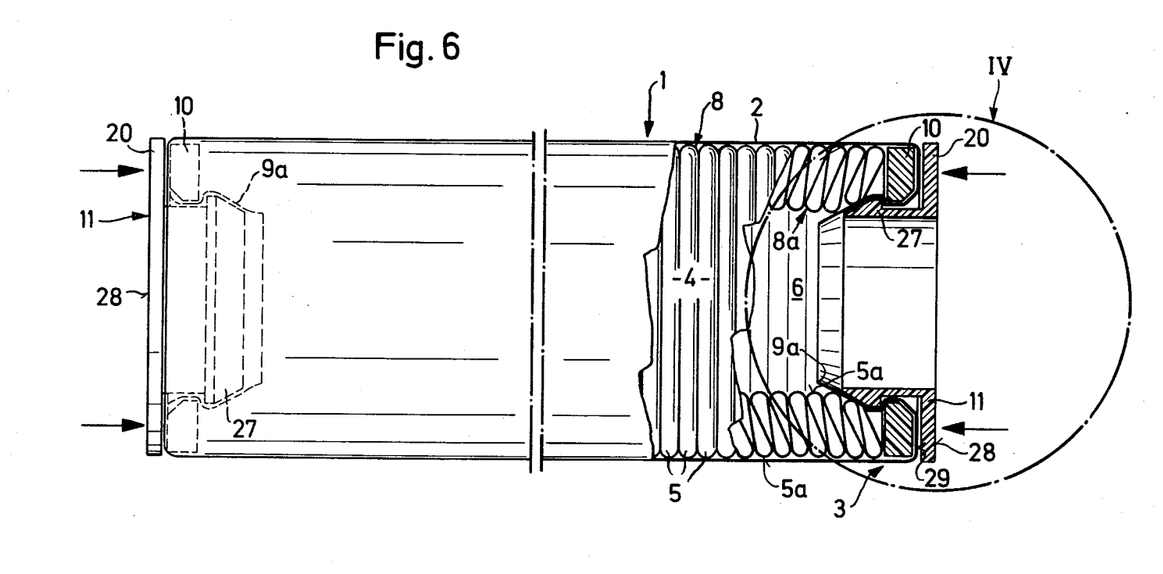
FIG. 6 shows a sheathed stick with the projecting portions of the jacket inverted over the surface of the annular disc in the direction of the interior of the stick, and a clamping element fixing the inverted projecting portion of the jacket.
Figure 7:
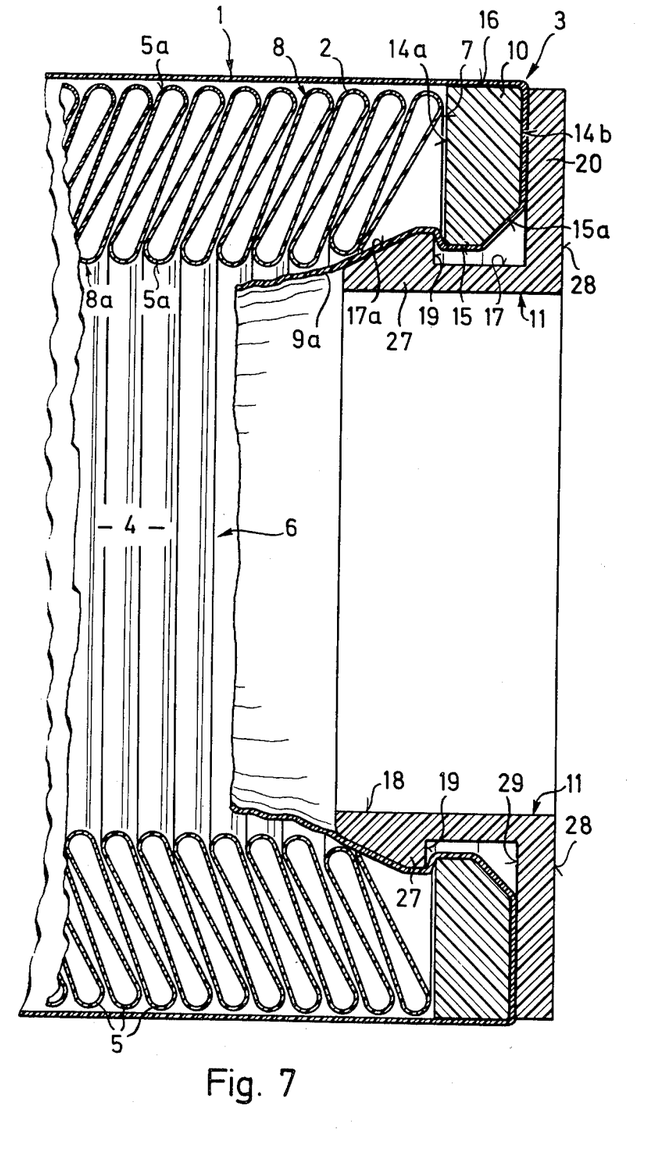
FIG. 7 shows the zone IV of FIG. 6 on an enlarged scale.
Figure 8:
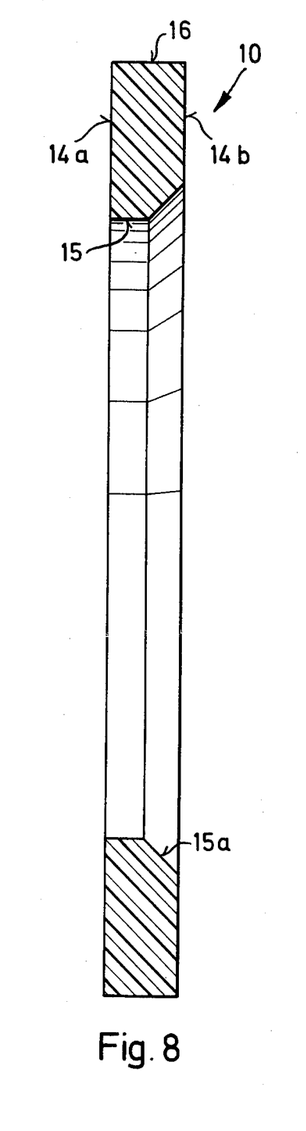
FIGS. 8 and 9 are exploded views of the elements forming the clamping device.

In FIG. 6, 11 is a clamping element, 20 is a flange brim at the clamping element 11, 27 is a thickening at 11, 28 is the outer surface and 29 the inner surface of the flange brim 20 of the clamping element 11, 9a is 9 in an inverted state (according to FIG. 1). The other numerals in FIG. 6 have the same meaning as in the previous Figures. The same applies to the numerals in FIGS. 7 and 8.

Figure 9:
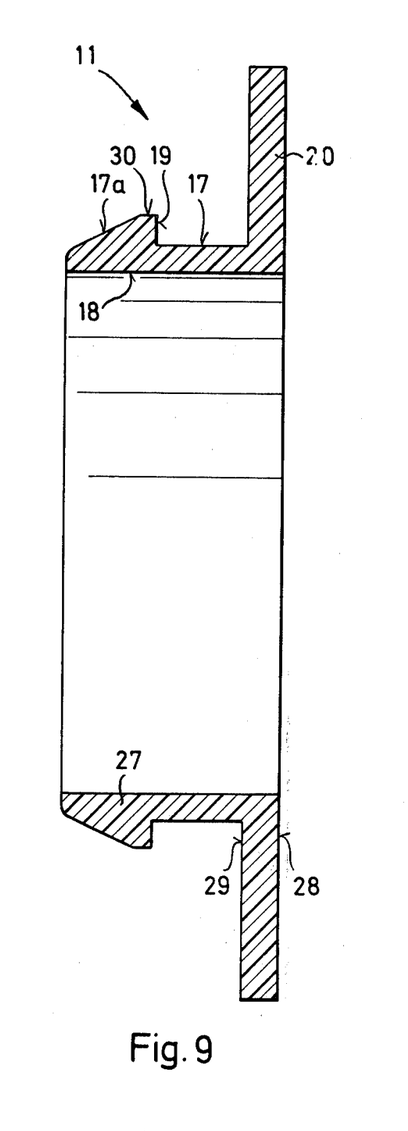

In FIG. 9, 11 is a clamping element, 17 is the outer wall of the hose liner, 18 is the inner wall of 11, 19 is a cocking lever of 11, 20 is a flange of 11, 28 is the outer surface of 20, 29 is the inner surface of 20, and 30 is the outer diameter of the cocking lever of 11.

Figure 10:
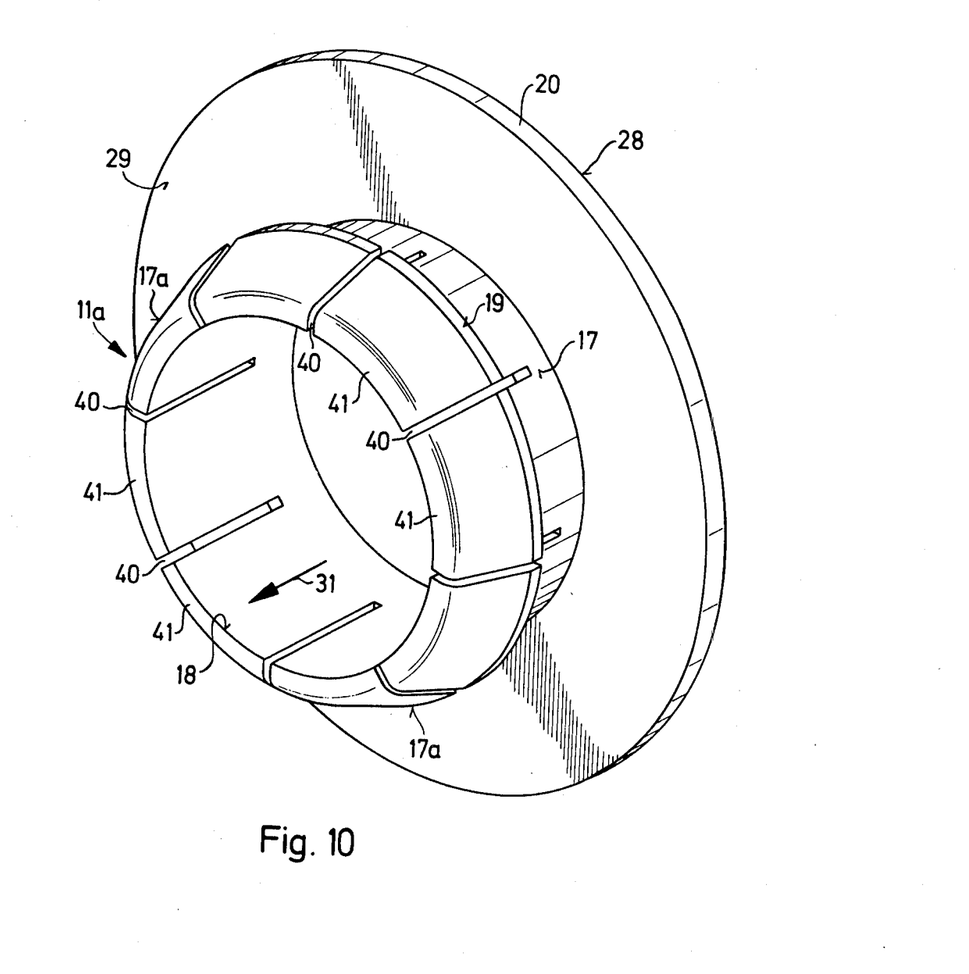
FIG. 10 shows a special embodiment of a part of the clamping device.

In FIG. 10, the numeral 11a designates the clamping element, 17 is the outer wall of the hose liner, 17a is the conical part of the outer wall of 11a, 18 is the inner wall of 11, 19 is the cocking lever of 11, 40 are slots, 41 is a flexible element, and 31 is an arrow.

Figure 11:
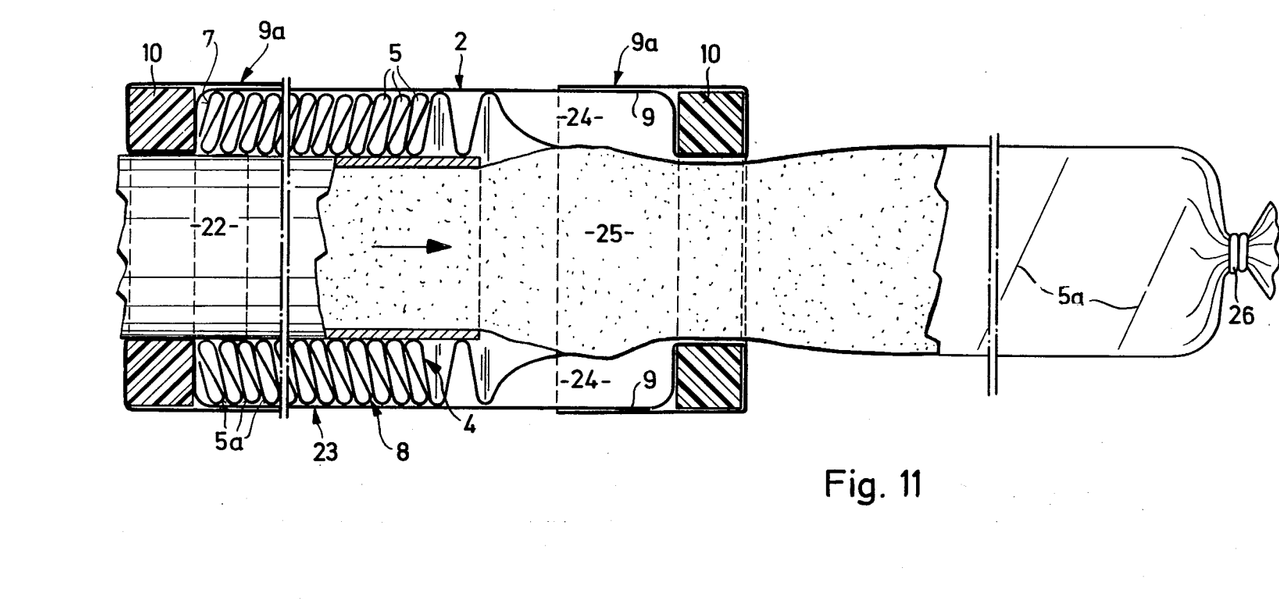
FIG. 11 shows a sheathed tubular casing being filled with sausage meat. In this figure the machine for filling the stick with sausage meat is not shown, but only the stuffing horn thereof out of which the sausage meat is pressed into the stick closed on one end.

In FIG. 11, 2 is the jacket, 4 is the stick, 5 are folds of the stick, 7 is the front wall of the stick, 8 is the outer wall of the stick, 9 is the projecting part of the jacket, 9a is the inverted portion of the projecting part of the jacket, 10 is the annular disc, 22 is the stuffing horn of the sausage filling machine, not shown, 23 is the sheathed stick, 24 is a hollow space in the jacket 2, 25 is sausage meat, 26 is the sealed end of the tube forming the stick, 5a is a line on the part of the tube formed by unfolding the stick, which line corresponds to the direction of the fold 5 of the stick.

It will be obvious to those skilled in the art that many modifications may be made within the scope of the present invention without departing from the spirit thereof, and the invention includes all such modifications.

What is claimed is:

1. A process for the production of a sheathed, hollow, cylindrical stick composed of a flexible tube folded by longitudinal shirring, which comprises inserting a stick composed of a longitudinally folded tube into a section of a jacket of sufficient length that it projects over both ends of said stick, sliding annular discs over said projecting portions of said jacket until said jacket presses on the front walls of said stick, and inverting said projecting portions of said jacket outwardly such that said inverted parts are parallel to and closely adjacent the exterior thereof.

2. A process according to claim 1 in which said tube and said jacket are based on cellulose hydrate.

3. A process according to claim 1 in which said jacket is based on cellulose hydrate having a component of paper fibers.

4. A process according to claim 1 in which said tube is based on cellulose hydrate having a component of paper fibers.

5. A process according to claim 1 in which said projecting portions of said jacket are wetted with water before or after being inverted.

* * * * *